Figure 1:
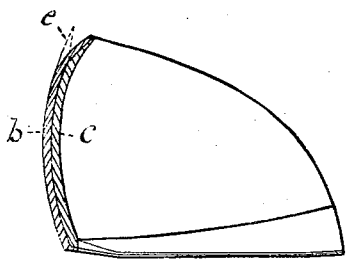
Figure 2:
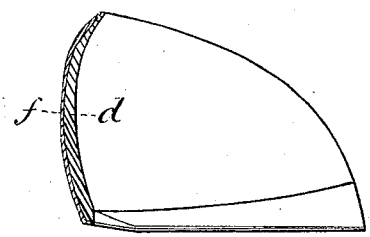
Figure 3:
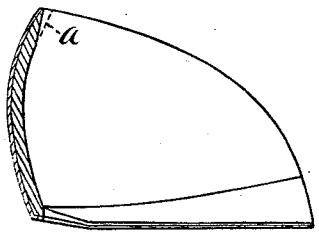
Figure 4:
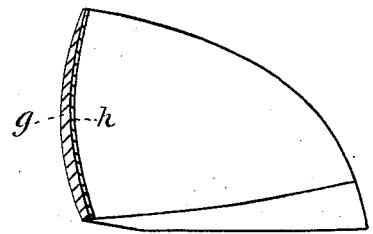

N. J. SIMONDS.
MANUFACTURE OF HEEL-STIFFENERS FOR BOOTS AND SHOES.
No. 189,067. Patented April 3, 1877.

WITNESSES.
Samuel D. Kelley
Daniel F. Harrigan.

INVENTOR.
Nathan J. Simonds,
By Porter & Hutchinson
Attorneys

UNITED STATES PATENT OFFICE.

NATHAN J. SIMONDS, OF WOBURN, MASSACHUSETTS.

IMPROVEMENT IN MANUFACTURE OF HEEL-STIFFENERS FOR BOOTS AND SHOES.

Specification forming part of Letters Patent No. 189,067, dated April 3, 1877; application filed October 5, 1876.

*To all whom it may concern:*

Be it known that I, NATHAN J. SIMONDS, of Woburn, in the county of Middlesex and State of Massachusetts, have invented new and useful Improvements in the Manufacture of Boot and Shoe Stiffenings; and I do hereby declare that the following is a description of my invention sufficient to enable those skilled in the art to practice it.

This invention relates to the processes and order in which such processes are employed in the manufacture of heel-stiffenings for boots and shoes; and the invention consists in remolding the stiffenings after they have been once molded, and then rendered nearly dry before such second process of molding takes place.

The advantages of my processes over those heretofore practiced are, briefly stated, as follows:

If the stiffening be sufficiently moist when molded to receive the proper impression of the form and mold, then when removed therefrom it subsequently loses, to a considerable extent, the perfect contour which the molds first imparted to it; but, by the process of molding and remolding, the stiffenings can be first molded when much more moist than if the process was not to be repeated; and when dried much beyond the proper degree for one impression, they can be again subjected to the mold, when they are brought permanently to the perfection of form and finish which is so desirable, and which is impossible of attainment by the usual single process of molding.

What I claim as my invention is—

In the manufacture of boot and shoe stiffeners, the improved process, consisting of first molding the stiffeners when in a moist state, then partially drying the same, and finally remolding to give it the perfect contour and finish requisite, all substantially as set forth.

NATHAN J. SIMONDS.

Witnesses:
EUGENE HUMPHREY,
T. W. PORTER.